(12) United States Patent
Mestres et al.

(10) Patent No.: US 9,601,320 B2
(45) Date of Patent: Mar. 21, 2017

(54) METHOD FOR STABILIZING A PLASMA AND AN IMPROVED IONIZATION CHAMBER

(71) Applicant: LASER SYSTEMS & SOLUTIONS OF EUROPE, Gennevilliers (FR)

(72) Inventors: Marc Mestres, Gennevilliers (FR); Paul Ceccato, Gennevilliers (FR)

(73) Assignee: LASER SYSTEMS & SOLUTIONS OF EUROPE, Gennevilliers (FR)

( * ) Notice: Subject to any disclaimer, the term of this patent is extended or adjusted under 35 U.S.C. 154(b) by 85 days.

(21) Appl. No.: 14/389,340

(22) PCT Filed: Mar. 28, 2013

(86) PCT No.: PCT/EP2013/056769
§ 371 (c)(1),
(2) Date: Sep. 29, 2014

(87) PCT Pub. No.: WO2013/149953
PCT Pub. Date: Oct. 10, 2013

(65) Prior Publication Data
US 2015/0063547 A1 Mar. 5, 2015

(30) Foreign Application Priority Data
Apr. 2, 2012 (EP) .................................... 12290116

(51) Int. Cl.
*H01J 47/02* (2006.01)
*H05G 2/00* (2006.01)
*H01S 3/0977* (2006.01)

(52) U.S. Cl.
CPC ........ *H01J 47/026* (2013.01); *H01S 3/09775* (2013.01); *H05G 2/003* (2013.01); *H05G 2/008* (2013.01)

(58) Field of Classification Search
CPC .... G01V 5/0025; G01N 23/203; G01N 23/04; G01N 2223/053
See application file for complete search history.

(56) References Cited

U.S. PATENT DOCUMENTS

| 4,194,813 A | 3/1980 | Benjamin et al. |
| 5,134,641 A | 7/1992 | Friede et al. |

(Continued)

FOREIGN PATENT DOCUMENTS

| CN | 101770924 A | 7/2010 |
| CN | 201821564 U | 5/2011 |

(Continued)

OTHER PUBLICATIONS

Chinese Office Action dated Mar. 3, 2016, in corresponding Chinese application, English translation included.

(Continued)

*Primary Examiner* — Hoon Song
(74) *Attorney, Agent, or Firm* — Young & Thompson

(57) ABSTRACT

A method for stabilizing a plasma is disclosed. The method includes (a) providing in an ionization chamber a number of high voltage wires and a gas suitable for forming a plasma, and (b) exposing the gas to a high voltage thereby igniting the gas to form the plasma. Upon ignition, the plasma is subjected to an amount of light. A use of the method to generate X-rays is also disclosed. The invention is further directed to an ionization chamber including (a) a gas suitable for forming a plasma, and (b) a number of high voltage wires for exposing the gas to a high voltage thereby igniting the gas to form the plasma. The ionization chamber includes a device for subjecting the plasma upon ignition to an amount of light. The invention relates to an X-ray generator including such ionization chamber and to a laser apparatus including such X-ray generator.

18 Claims, 2 Drawing Sheets

(56) References Cited

U.S. PATENT DOCUMENTS

| | | | |
|---|---|---|---|
| 2001/0032590 A1 | 10/2001 | Carducci et al. | |
| 2008/0298552 A1* | 12/2008 | Derra | B82Y 10/00 |
| | | | 378/122 |
| 2008/0302652 A1 | 12/2008 | Entley et al. | |
| 2009/0127479 A1* | 5/2009 | Hosokai | B82Y 10/00 |
| | | | 250/504 R |

FOREIGN PATENT DOCUMENTS

| | | |
|---|---|---|
| JP | H08-139419 A | 5/1996 |
| JP | 2010-20561 A | 8/2011 |
| TW | 200503589 A | 1/2005 |
| TW | 200526086 A | 8/2005 |
| WO | WO 89/10003 | 10/1989 |

OTHER PUBLICATIONS

Taiwanese Office Action and Search Report dated Aug. 8, 2016, in corresponding Chinese application, English translation included.

\* cited by examiner

METHOD FOR STABILIZING A PLASMA AND AN IMPROVED IONIZATION CHAMBER

This Application is the U.S. National Phase of International Application Number PCT/EP2013/056769 filed on Mar. 28, 2013, which claims priority to European Patent Application Number 12290116.8 filed on Apr. 2, 2012.

FIELD OF THE INVENTION

The present invention relates to a method for stabilizing a high-voltage induced plasma.

In addition, the invention relates to the use of such method in generating X-rays.

Further, the present invention relates to an ionization chamber for forming a high-voltage induced plasma.

Additionally, the invention relates to an X-ray generator comprising such ionization chamber, and further to a laser apparatus comprising such X-ray generator.

BACKGROUND OF THE INVENTION

It is known that the discharge stability of pulsed gas lasers is greatly enhanced by supplying a pre-ionizing radiation to the gaseous medium. One of the possibilities for obtaining pre-ionization is using an X-ray generator. An example thereof is described in WO8910003.

In general, the performance of an X-ray generator is based on the following principle:
 - a plasma is created as a positive ion source
 - the positive ions are accelerated towards a negatively polarized electrode and create secondary electrons upon collision with this electrode
 - the resulting electron beam is accelerated away from the same electrode and send to collide with a metallic plate
 - upon collision of the electron beam on the metallic plate, X-rays are generated.

In a particle type of X-ray generator, one or multiple wires are positioned inside an ionization chamber filled with low pressure gas such as helium. As a high voltage pulse is applied to the wire(s), plasma will form in the ionization chamber creating a high density of positive ions. This type of positive ion source can be operated at very high repetition rate.

However, a general and commonly known performance limitation is that, when the plasma has not been ignited for a certain period of time (typically more than one 1 minute), its stability can be erratic,—so called jitter-effect—, or it may generate a lower ion density than usual. This is probably linked to insufficient amount of electrical charges necessary to maintain the plasma upon ignition.

Since it is further commonly recognized that the timing of the X-ray pre-ionizing beam generated by an X-ray generator with respect to the main laser discharge has a great influence on laser output energy and stability, unstable plasma may seriously compromise optimum performance of the main laser discharge.

In an attempt to solve the above problem, the amount of electrical charges for maintaining the plasma upon ignition can be increased by increasing the high voltage applied to the wire(s), or by applying a number of pulses with lower voltage subsequently to a first high voltage pulse. However, a disadvantage thereof is that the stress on the high voltage wires is increased and that a higher failure risk is present due to arcing in the ionization chamber.

It is therefore an object of the present invention to provide a method enabling improved stability of the plasma upon ignition, in particular after not been ignited for a certain period of time.

It is another object of the present invention to provide a method generating a stable and even improved ion density.

In addition, it is an object of the present invention to provide an ionization chamber improved stability of the plasma upon ignition, in particular after not been ignited for a certain period of time.

A further object of the present invention is to provide an improved X-ray generator.

Still another object of the present invention is to provide an improved laser apparatus.

The present invention meets the above objects by subjecting the plasma upon ignition to an amount of light.

SUMMARY OF THE INVENTION

The present invention is directed to a method for stabilizing a plasma comprising:
 a. providing in an ionization chamber a number of high voltage wires and a gas suitable for forming a plasma
 b. exposing the gas to a high voltage thereby igniting the gas to form the plasma,
characterized in that upon ignition the plasma is subjected to an amount of light.

In addition, the present invention is directed to the use of such method in generating X-rays.

Further, the present invention is directed to an ionization chamber comprising:
 a. a gas suitable for forming a plasma, and
 b. a number of high voltage wires for exposing the gas to a high voltage thereby igniting the gas to form the plasma,
characterized in that the ionization chamber comprises means for subjecting the plasma upon ignition to an amount of light.

Additionally, the present invention relates to an X-ray generator comprising such ionization chamber, and to a laser apparatus comprising such X-ray generator.

DESCRIPTION OF THE INVENTION

Figure 1:
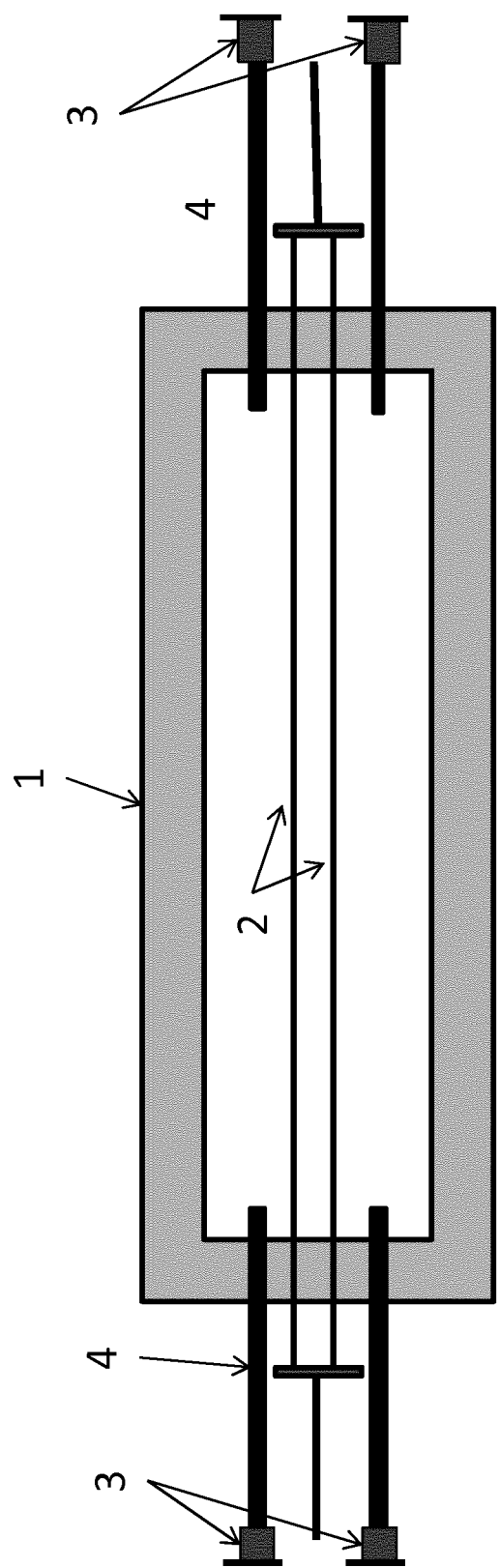
FIG. 1 illustrated an embodiment in accordance with the present invention.

In a first embodiment in accordance with the present invention a method for stabilizing a plasma comprising:
 a. providing in an ionization chamber a number of high voltage wires and a gas suitable for forming a plasma
 b. exposing the gas to a high voltage thereby igniting the gas to form the plasma,
characterized in that upon ignition the plasma is subjected to an amount of light.

Applicant surprisingly found and confirmed experimentally that providing optical radiation (light) into the ionization chamber upon ignition of the plasma has the effect of suppressing the instability,—the so-called jitter—, in particular after not been ignited for a relatively long period of time.

Without being bound by any theory, subjecting the plasma to light may help creating sufficient electrical charges on the surface or in the volume of the ionization chamber necessary to maintain the plasma upon ignition. It is believed that subjection to light enforces excitation of ions in the plasma thereby improving the stability of the plasma.

The plasma may be ignited from any kind of ionizable gas, preferably selected from the group of noble gases such as helium (He), neon (Ne), argon (Ar), or mixtures thereof.

In accordance with the present invention, within the ionization chamber the ionizable gas is under a pressure in the range of a medium vacuum, preferably in a range from 1 to 100 Pa.

The light may have any wavelength suitable for suppressing the instability of a plasma. More specifically, the wavelength may be between 10 and 1100 nanometer, between 100 and 800 nanometer, between 400 and 800 nanometer (visible light range), or between 100 and 400 nanometer (UV range).

The light may have a radiation energy from 1 mW to 5000 mW, from 1 mW to 3000 mW, preferably form 100 mW to 1500 mW.

The light may be pulsed or continuous. Continuous light may have the advantage over pulsed light that precise synchronization between light pulse and ionization discharge is not required.

The light may be focused on one or more of the high voltage wires in the ionization chamber, or on the ignited plasma "center". Preferably, the light is substantially directed into the ionization chamber as a whole. It may be advantageous to expose substantially the whole ionization chamber to light instead of only part of it (or part of the plasma), as this may result in more efficient stabilization of the plasma upon ignition.

In an embodiment in accordance with the present invention, the present invention provided an ionization chamber (1) comprising:
a. a gas suitable for forming a plasma, and
b. a number of high voltage wires (2) for exposing the gas to a high voltage thereby igniting the gas to form the plasma, characterized in that the ionization chamber comprises means for subjecting (3, 3', 4, 4') the plasma upon ignition to an amount of light.

In the ionization chamber, a gas suitable for forming a plasma,—also called an ionizable gas—, is present in medium vacuum conditions. One or a number of high voltage wires are positioned preferably centrally in the ionization chamber and connected to a high voltage source.

Upon ignition of the ionizable gas by applying a high voltage, the formed plasma is exposed to an amount of light for stabilizing the plasma.

In accordance with the present invention, the means for subjecting the plasma to an amount of light may comprise any light source and/or optical system suitable for providing light with a wavelength between 10 and 1100 nanometer, between 100 and 800 nanometer, between 400 and 800 nanometer (visible light range), or between 100 and 400 (UV spectral range), the latter possibly resulting in better efficiency due to the higher photon energy The light source may have radiation energy from 1 mW to 5000 mW, from 1 mW to 3000 mW, preferably form 100 mW to 1500 mW and may be continuous or pulsed. In the latter case the optical source can be synchronized to the high voltage pulse applied to the wires in order to provide a pulse of light upon ignition of the plasma.

The means for subjecting the plasma to an amount of light may be adapted for focusing the light onto the one or more high voltage wires, or on the ignited plasma "center". Preferably, it may be adapted for directing light substantially into the ionization chamber as a whole, i.e. not focused on part of the ionization chamber or not focused at all.

In an embodiment in accordance with the present invention, the means for subjecting the plasma to an amount of light may comprise one or a plurality of internal light sources, i.e. light sources installed within the ionization chamber, or one or a plurality of external light sources (3, 3'), i.e. light sources installed outside the ionization chamber.

In the latter case, the means for subjecting the plasma to an amount of light may additionally comprise one or multiple transparent windows (4') incorporated in the walls of the ionization chamber (1), or may alternatively comprise dedicated optics for guiding the light (4) from the external source(s) (3, 3') into the ionization chamber.

The light source may be any light source suitable for generating light with wavelength and radiation energy in the ranges as indicated above, such as a continuous or flash lamp, a laser, a light emitting diode (LED), etc.

Such optics for guiding the light from the external source(s) into the ionization chamber may comprise any kind of optical instrument suitable for guiding light such as for example mirrors, lenses, beam splitters, prisms, optical waveguides such as optical fibers, etc.

In a particular embodiment of the present invention as illustrated in FIG. 1, the means for subjecting the plasma to an amount of light may comprise several Light Emitting Diodes (LED) (3) emitting in the visible spectral range (400-800 nm), wherein each LED output is coupled to an optical fiber (4). Each optical fiber output is inserted into the ionization chamber with sealed feedthrough. The optical fibers may be inserted at one or more sides, or at opposite sides of the ionization chamber.

Figure 2:
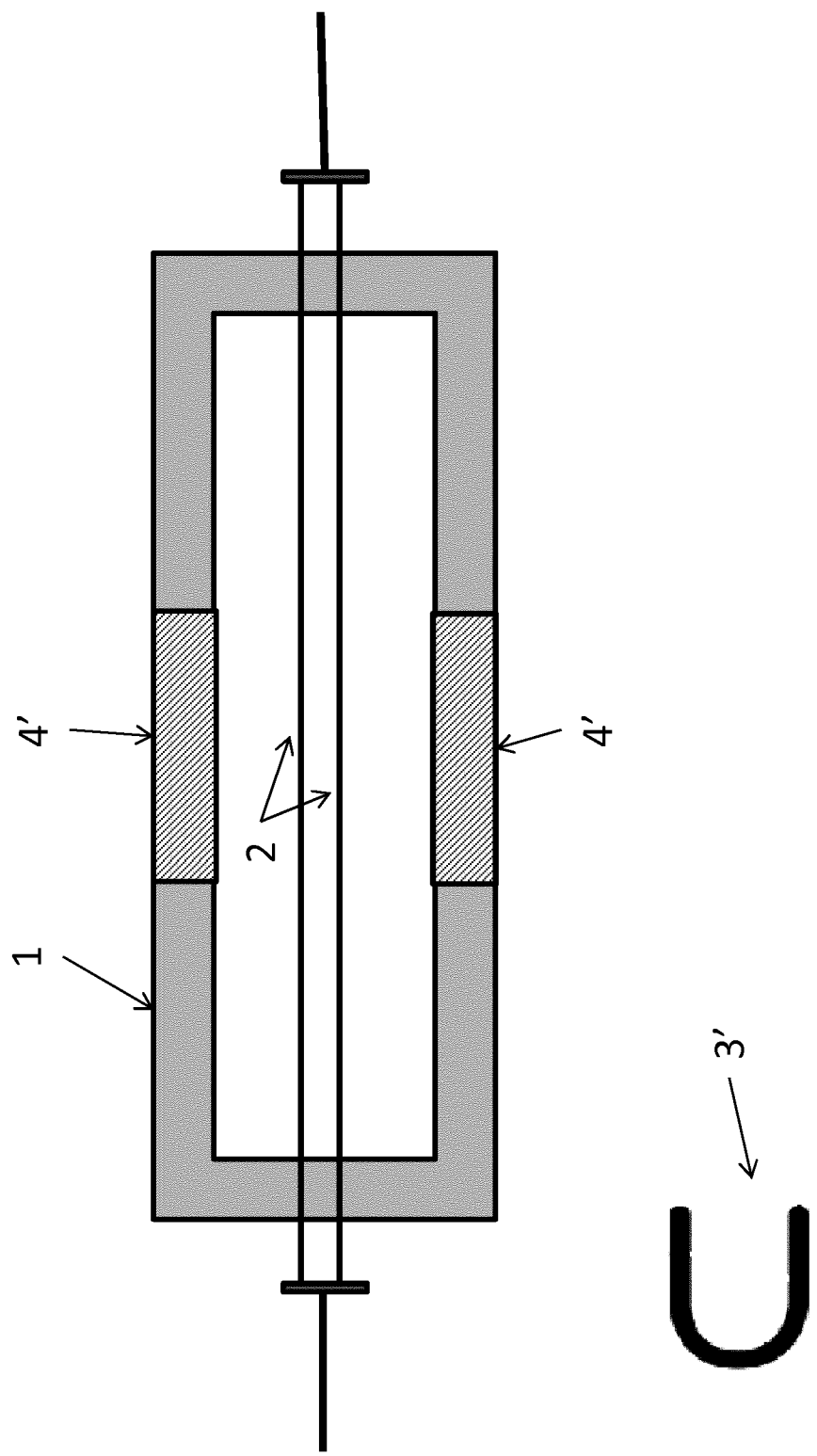
FIG. 2 illustrated another embodiment in accordance with the present invention.

Alternatively and as illustrated in FIG. 2, the means for subjecting the plasma to an amount of light may comprise a flash lamp (3') emitting in the UV spectral range, and one or more windows (4') incorporated into the walls of the ionization chamber.

In addition, in an embodiment according to the present invention, a method for stabilizing a plasma as described above may be used for generating X-rays. Generating X-rays is based then on the following principle:
1. a low pressure wire plasma which is stabilized upon ignition by subjecting it to an amount of light creates positive ions
2. The positive ions are accelerated towards a negatively polarized electrode and create secondary electrons upon collision with this electrode
3. The resulting electron beam is accelerated away from the same electrode and send to collide with a metallic plate
4. Upon collision of the electron beam on the metallic plate, X-ray are generated Further, in another embodiment according to the present invention, an ionization chamber as described above may be used in an X-ray generator, and an X-ray generator having such ionization chamber incorporated may be used in a laser apparatus.

The invention claimed is:
1. A method for stabilizing a plasma comprising:
(a) providing in an ionization chamber, a number of high voltage wires and a gas suitable for forming a plasma; and
(b) exposing the gas to a high voltage thereby igniting the gas to form the plasma, wherein upon ignition, the plasma is subjected to an amount of light having a radiation energy from 100 mW to 1500 mW.

2. The method according to claim 1, wherein the light has a wavelength between 10 and 1100 nanometers.

3. The method according to claim 1, wherein the light is continuous.

4. The method according to claim 3, wherein the light is substantially directed into the ionization chamber as a whole.

5. The method according to claim 1, further comprising the step of C using X-rays generated after exposing the gas to the light.

6. The method of claim 2, wherein the light is continuous while subjecting the plasma to the light.

7. An ionization chamber comprising:
   (a) a gas suitable for forming a plasma; and
   (b) a number of high voltage wires for exposing the gas to a high voltage thereby igniting the gas to form the plasma,
   wherein the ionization chamber comprises a device for subjecting the plasma upon ignition to an amount of light, having a radiation energy from 100 mW to 1500 mW.

8. The ionization chamber according to claim 7, wherein the device for subjecting the plasma to an amount of light comprises a light source with a wavelength between 10 and 1100 nanometers.

9. The ionization chamber according to claim 8, wherein the device for subjecting the plasma to an amount of light comprises a continuous light source.

10. The ionization chamber according to claim 7, wherein the device for subjecting the plasma to an amount of light is adapted for directing light substantially into the ionization chamber as a whole.

11. The ionization chamber according to claim 10, wherein the device for subjecting the plasma to an amount of light comprises one or a plurality of external light sources and optical waveguides for guiding the light into the ionization chamber.

12. The ionization chamber according to claim 11, wherein the optical waveguides comprise optical fibers.

13. A laser apparatus comprising an ionization chamber comprising:
   (a) a gas suitable for forming a plasma; and
   (b) a number of high voltage wires for exposing the gas to a high voltage thereby igniting the gas to form the plasma,
   wherein the ionization chamber comprises a device for subjecting the plasma upon ignition to an amount of light with radiation energy from 100 mW to 1500 mW, said device comprising a light source having the radiation energy from 100 mW to 1500 mW.

14. The laser apparatus according to claim 13 comprising an X-ray generator.

15. The laser apparatus according to claim 13, wherein the light is continuous.

16. The laser apparatus according to claim 13, wherein the light is substantially directed into the ionization chamber as a whole.

17. The laser apparatus of claim 13, wherein the light source is a continuous light source that provides continuous light at the radiation energy from 100 mW to 1500 mW.

18. The ionization chamber of claim 13, wherein the light source is a continuous light source that provides continuous light at the radiation energy from 100 mW to 1500 mW.

* * * * *